US012023299B2

(12) United States Patent
Chuang

(10) Patent No.: US 12,023,299 B2
(45) Date of Patent: Jul. 2, 2024

(54) MASSAGE DEVICE

(71) Applicant: Jaguar Precision Industry Co., Ltd., New Taipei (TW)

(72) Inventor: Fei-Tyh Chuang, New Taipei (TW)

(73) Assignee: JAGUAR PRECISION INDUSTRY CO., LTD., New Taipei (TW)

( * ) Notice: Subject to any disclaimer, the term of this patent is extended or adjusted under 35 U.S.C. 154(b) by 547 days.

(21) Appl. No.: 17/135,701

(22) Filed: Dec. 28, 2020

(65) Prior Publication Data

US 2021/0113421 A1 Apr. 22, 2021

Related U.S. Application Data

(63) Continuation-in-part of application No. 16/192,947, filed on Nov. 16, 2018, now abandoned.

(30) Foreign Application Priority Data

Nov. 27, 2017 (TW) ................................ 106141197
Sep. 29, 2020 (TW) ................................ 109133789

(51) Int. Cl.
*A61H 7/00* (2006.01)

(52) U.S. Cl.
CPC ......... *A61H 7/00* (2013.01); *A61H 2201/123* (2013.01); *A61H 2201/1664* (2013.01); *A61H 2201/5064* (2013.01); *A61H 2230/605* (2013.01)

(58) Field of Classification Search
CPC ...... A61H 23/0218; A61H 1/00; A61H 1/008; A61H 39/04; A61H 23/006;
(Continued)

(56) References Cited

U.S. PATENT DOCUMENTS

2009/0043231 A1 2/2009 Murugan et al.
2009/0065226 A1* 3/2009 John ..................... H02K 33/16 173/93
(Continued)

FOREIGN PATENT DOCUMENTS

CN 202620139 U 12/2012
CN 203763475 U 8/2014
(Continued)

OTHER PUBLICATIONS

JP Office Action dated 2019-10-29 in Japanese application (No. 2018220513).
(Continued)

*Primary Examiner* — Timothy A Stanis
*Assistant Examiner* — Matthew R Moon
(74) *Attorney, Agent, or Firm* — McClure, Qualey & Rodack, LLP

(57) ABSTRACT

The present invention relates to an electric massage device capable of gradually increasing a massage force during an outward stroke, mainly comprising a massage module and a control module. In the outward stroke, the control module applies a driving current to the electromagnetic driving unit, and the driving current is gradually increased with an elapsed time or a stroke displacement of the output shaft. In a return stroke, the control module deenergizes the driving current or applies a weak reverse current less than one-fifth of the driving current. At the beginning of the outward stroke, the massage force is weak due to the smaller driving current and hence would not cause skin hurt. At the end of the outward stroke, the massage force is strong due to the greater driving current and hence produces a deep muscle massage effect.

10 Claims, 5 Drawing Sheets

(58) Field of Classification Search
CPC .... A61H 2201/5005; A61H 2201/5064; A61H 2201/5007; A61H 2201/1669; A61H 2201/5035; A61H 2201/5025; A61H 2201/1685; A61H 2201/5038; A61H 2201/0169; A61H 2201/1207; A61H 2201/0153; A61H 2201/123; A61H 31/00; A61H 31/004; A61H 31/006; B25D 11/005; B25D 11/0064; B25D 17/245
See application file for complete search history.

(56) References Cited

U.S. PATENT DOCUMENTS

| | | | | |
|---|---|---|---|---|
| 2011/0224580 | A1* | 9/2011 | Leathers | A61B 5/103<br>600/587 |
| 2013/0333909 | A1* | 12/2013 | Binder | H02K 33/12<br>173/117 |
| 2017/0087041 | A1 | 3/2017 | Babiuk | |
| 2019/0083354 | A1* | 3/2019 | Pahl | A61H 9/005 |
| 2019/0159961 | A1 | 5/2019 | Chuang | |
| 2020/0000678 | A1* | 1/2020 | Kao | A61H 23/0218 |
| 2020/0214932 | A1 | 7/2020 | Pahl et al. | |

FOREIGN PATENT DOCUMENTS

| | | | |
|---|---|---|---|
| CN | 103462793 | B | 4/2016 |
| CN | 105515334 | A | 4/2016 |
| CN | 206516442 | U | 9/2017 |
| CN | 210124351 | U | 3/2020 |
| JP | 5742451 | | 9/1982 |
| JP | 06054887 | A2 | 3/1994 |
| JP | H08116658 | A | 5/1996 |
| JP | H08116658 | A * | 5/1996 |
| JP | 2004081522 | A | 3/2004 |
| JP | 2005270591 | A | 10/2005 |
| JP | 3160611 | U | 7/2010 |
| JP | 2015085150 | A | 5/2015 |
| KR | 100667872 | B1 | 1/2007 |
| TW | M343481 | U | 11/2008 |
| TW | M446632 | U | 2/2013 |
| TW | 201440753 | A | 11/2014 |
| TW | M508318 | U | 9/2015 |
| TW | I656870 | B | 4/2019 |
| WO | 2017158107 | A1 | 9/2017 |

OTHER PUBLICATIONS

CN Office Action dated 2019-10-08 in Chinese application (No. 201810863755.2).

JP Office Action dated 2020-06-24 in Japanese application (No. 2018220513).

McHenry, Encyclopedia of Materials: Science and Technology (Second Edition); pp. 4961-4964; 2001; https://www .sciencedirect.com/ science/article/pii/ 80080431526008627 (Year: 2001).

* cited by examiner

MASSAGE DEVICE

BACKGROUND OF THE INVENITON

Field of the Invention

The present invention relates to an electric massage device capable of gradually increasing a massage force during an outward stroke, and in particular to a massage device suitable for muscle massage, acupressure massage, acupuncture point massage, pain relief massage or pain treatment massage.

Description of the Related Art

As various sport exercises are getting popular, the market demand for massage devices for relaxing muscles after exercises is increasing. The market demand for massage guns is growing strongly, because the massage guns can be used to massage intended points on a human body by users.

The massage strokes of traditional massage devices are invariable. For example, a device such as a cam is used to convert a rotary motion into a linear motion. For a massage gun, during the entire massage stroke, a massage head of the massage gun applies impact massage to the skin and superficial muscles, and then to the deep muscles. Generally, the massage force is so selected that it is strong enough to generate a massage effect on deep muscles at intended points on a human body. However, due to the mechanism of the traditional massage gun, the user feels pain when the massage head hits the skin and superficial muscles. If the stroke of the cam is shortened to reduce the massage force in order to relieve the aforementioned pain, the massage effect on the deep muscles may be greatly reduced.

The existing massage gun mostly uses an eccentric cam to convert a rotary motion driven by a motor into a linear motion. In one revolution of the motor, the output shaft of the massage gun moves forward to produce a massage effect in the first half of the cycle time, and moves backward in the second half of the cycle time. However, this existing massage guns are limited by the characteristics of the cam mechanism, and the massage depth is invariable and not adjustable. Also, due to the fact that the return stroke is not a massage stroke, no actual effective work is produced with energy consumption and heat generation. Moreover, there is another type of a traditional massage gun, i.e. an impact gun comprising a linear actuator with a spring. When the linear actuator is energized, the linear actuator drives an impact massage head. The massage head returns to the initial position under the effect of the spring force. The advantage of this type of existing massage gun is that the massage depth and strength are adjustable. However, since a linear actuator is adopted, loud noise is generated during the outward stroke. Further, since it produces an instantaneous impact force, it is suitable for spine correction. On the other hand, if such an impact gun is used to massage muscles, the instantaneous impact force may cause skin hurt and injure the muscles due to excessive force.

A massage device with simple structure, low energy consumption, low noise, high efficiency, and high reliability which not only can effectively massage the deep muscles, but also can relieve the pain of the skin or superficial muscles, is highly anticipated by the industry and the public.

SUMMARY OF THE INVENTION

The main objective of the present invention is to provide an electric massage device capable of gradually increasing a massage force during an outward stroke, so as to provide the massage force having different strength. When the massage head impacts the surface skin and superficial muscles, the massage force is weak, so it can significantly relieve pain; and when the massage head reaches a deeper area to be massaged or an intended point for massage, the massage force is increased, thereby producing an effective massage effect.

In order to achieve the above-mentioned object, an electric massage device of the present invention capable of gradually increasing a massage force during an outward stroke mainly comprises a massage module and a control module. The massage module includes an output shaft and an electromagnetic driving unit. The electromagnetic driving unit is configured to drive and move the output shaft in a linear motion so as to produce impact and vibration massage effects on a user. The control module is electrically connected to the electromagnetic driving unit and is configured to energize the electromagnetic driving unit. One massage cycle includes the outward stroke and a return stroke. In the outward stroke, the control module applies a driving current to the electromagnetic driving unit, and the driving current gradually increases in response to an elapsed time of the outward stroke or a stroke displacement of the output shaft. In the return stroke, the control module deenergizes the electromagnetic driving unit or applies a reverse current to the electromagnetic driving unit. The reverse current has an opposite polarity to the driving current and is smaller than the driving current. The reverse current may be less than one-fifth of the driving current.

Accordingly, in the present invention, the driving current is gradually increased during the outward stroke, i.e., the massage force is gradually increased, wherein at the beginning of the outward stroke, the massage force is weak due to the smaller driving current and hence would not cause skin hurt. At the end of the outward stroke, the massage force is strong due to the greater driving current and hence produces a deep tissue muscle massage effect.

According to Hooke's law, for an elastic body or a spring, there is a linear relationship between the force exerted on the elastic body or spring and the deformation, that is, the force exerted on the elastic body or spring is directly proportional to the deformation. The formula is expressed as $F=-k\times(L-L_0)=-k\times\Delta x$, where F is a restoring force of a spring, of which the strength is equal to an external force in an opposite direction, k is coefficient of elasticity, L is the total length of the stretched spring, and $L_0$ is the original length of the spring. The soft tissue of the human body can also be regarded as an elastic body or a spring. The more deeply the muscles is pressed, the greater the required force is. If the massage force of the massager is gradually increased with the elapsed time, the massage force exerted on the superficial body surface at the beginning would be small and would not cause skin hurt and injure the muscles due to an excessive impact force. On the other hand, at the end of the outward stroke, the massage force is strong enough to produce a deep muscle massage effect. Such a massage force in the outward stroke can be properly formulated, so that a comfortable, safe, and effective massage effect which would not cause skin hurt and injury the muscles can be achieved.

Preferably, the stroke displacement of the output shaft can be detected by a stroke detecting module, and the stroke detecting module is electrically connected to the control module. The control module gradually increases the driving current according to the real-time stroke displacement value detected by the stroke detecting module. In other words, the massage force can be adjusted according to the real-time position of the output shaft in the outward stroke, and there is a linear relationship or a non-linear relationship between the stroke displacement and the current; that is, the closer to the end of the output stroke the position of the output shaft is, the greater the massage force is.

The electric massage device of the present invention can further comprise a memory module, which stores a current-position function table. The current-position function table stores a plurality of real-time stroke displacement values and driving current values corresponding to the real-time stroke displacement values, respectively. The control module can adjust the driving current with a driving current value obtained from the current-position function table corresponding to a real-time stroke displacement value detected by the stroke detecting module. In other words, the present invention can be also in a non-linear output mode; that is, different driving current values at respective stroke displacements or positions can be preset by means of the current-position function table so as to provide different massage forces. Accordingly, the massage force can be set and adjusted flexibly based on actual demand.

If the control module applies the driving current to the electromagnetic driving unit and if the stroke detecting module detects a real-time stroke displacement value, then the control module can calculate a muscle elasticity coefficient and adjust the driving current, accordingly. Also, the values in the current-position function table can be further updated. In other words, the control module may calculate the elasticity coefficient of the muscle tissue where the massage is applied based on the detected real-time stroke displacement value after applying the driving current, and the driving current can be further adjusted to achieve more comfortable and more effective massage.

In addition, the electric massage device of the present invention can further comprise an output adjusting module, which is electrically connected to the control module and is configured to adjust at least one of the frequency of the driving current applied to the massage module and the time period during which the driving current is applied. The output adjusting module may include a massage time adjusting unit and a massage frequency adjusting unit. The massage time adjusting unit is configured to adjust the time period during which the driving current is applied, and the massage frequency adjusting unit is configured to adjust the frequency of the driving current.

Furthermore, the electric massage device of the present invention may further comprise a current detecting module, which is electrically connected to the control module and the electromagnetic driving unit and is configured to detect a feedback current of the electromagnetic driving unit. The driving current is adjusted by the control module in a closed-loop control fashion based on the feedback current. In other words, the control module is capable of controlling the driving current of the massage module in a closed-loop control fashion by comparing the feedback current detected by the current detecting module with a set current, so as to fine-tune the driving current applied to the massage module and hence ensure that the desired massage force of the massage module can be obtained.

More preferably, in the present invention, in the outward stroke, the time period during which the driving current is applied to the electromagnetic driving unit by the control module can be less than one-tenth of a cycle time of a massage cycle or five times a time constant. The outward stroke and the return stroke form the massage cycle, and the time constant is the ratio of the total inductance value of the electromagnetic driving unit to the total resistance value of the electromagnetic driving unit. Accordingly, in the present invention, the time period during which the driving current is applied is very short, and a large frequency bandwidth is generated correspondingly, so it is easy for the electric massage device to operate at the resonance frequency of the muscle where the massage is applied; that is, the output massage and the muscle can easily form a resonance so that pain caused by the soft tissue disorder can be relieved, the blood circulation can be promoted, and the massage effect can be improved.

DESCRIPTION OF THE PREFERRED EMBODIMENTS

Figure 1:
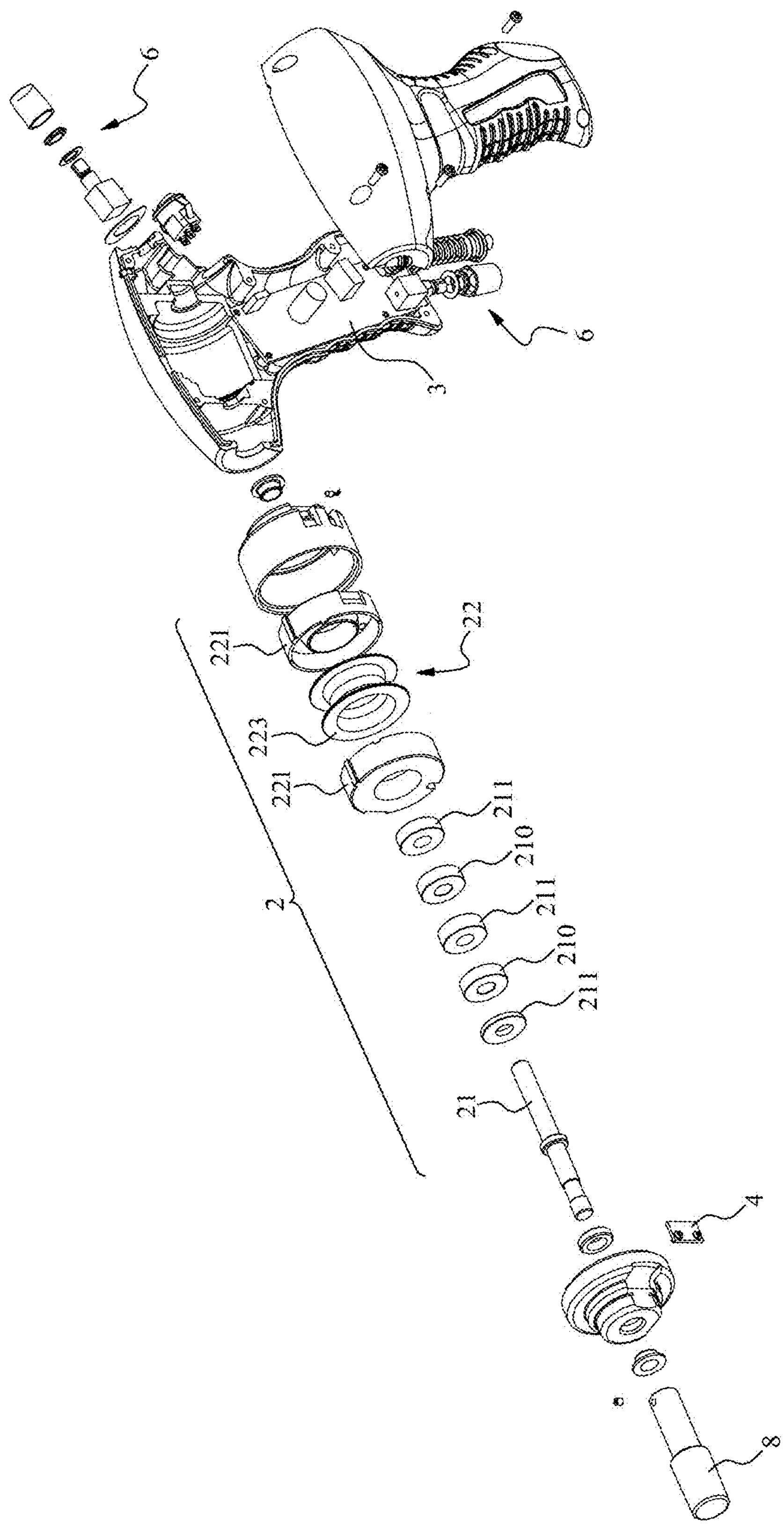
FIG. 1 is an exploded view of a first embodiment of the present invention.

Before describing an electric massage device capable of gradually increasing a massage force during an outward stroke of the present invention in detail, it should be noted that in the descriptions, similar elements will be denoted by the same reference numerals. Furthermore, the drawings illustrating the present invention are only schematic and not necessarily drawn to scale, and may not show all details of the present invention.

Figure 2:
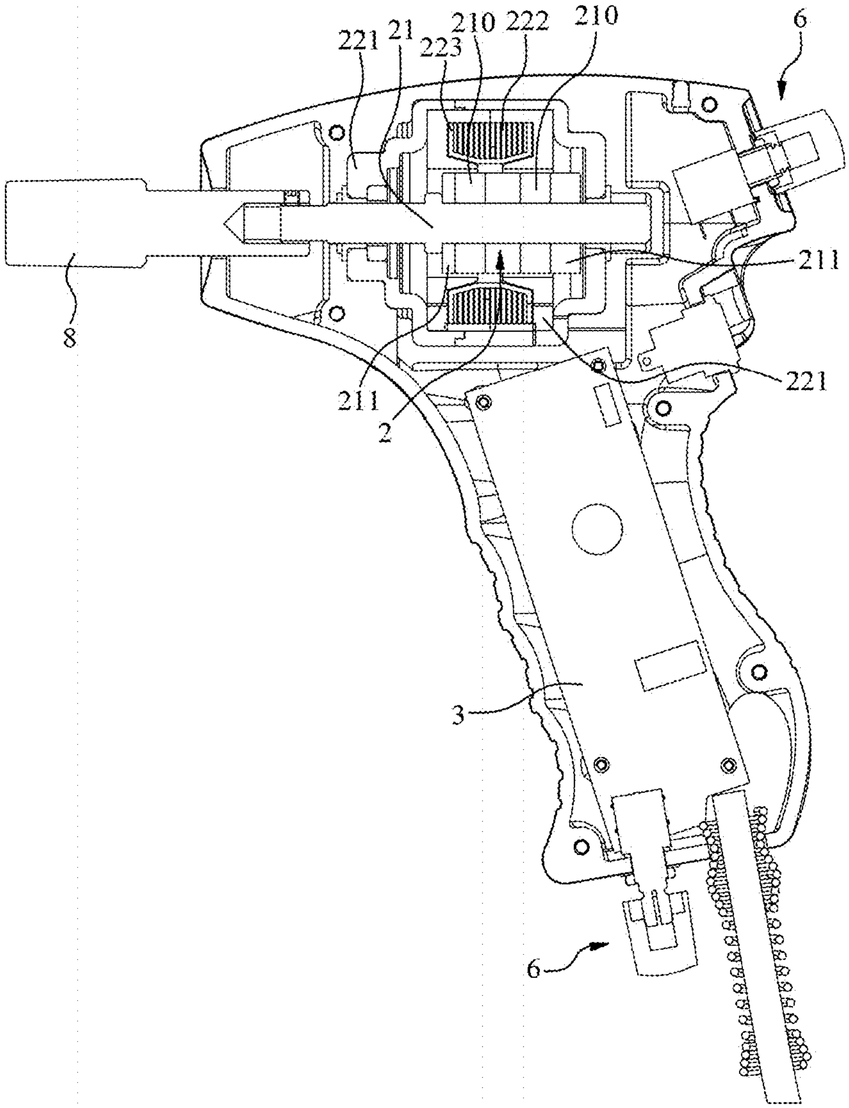
FIG. 2 is a cross-sectional view of the first embodiment of the present invention.
Figure 3:
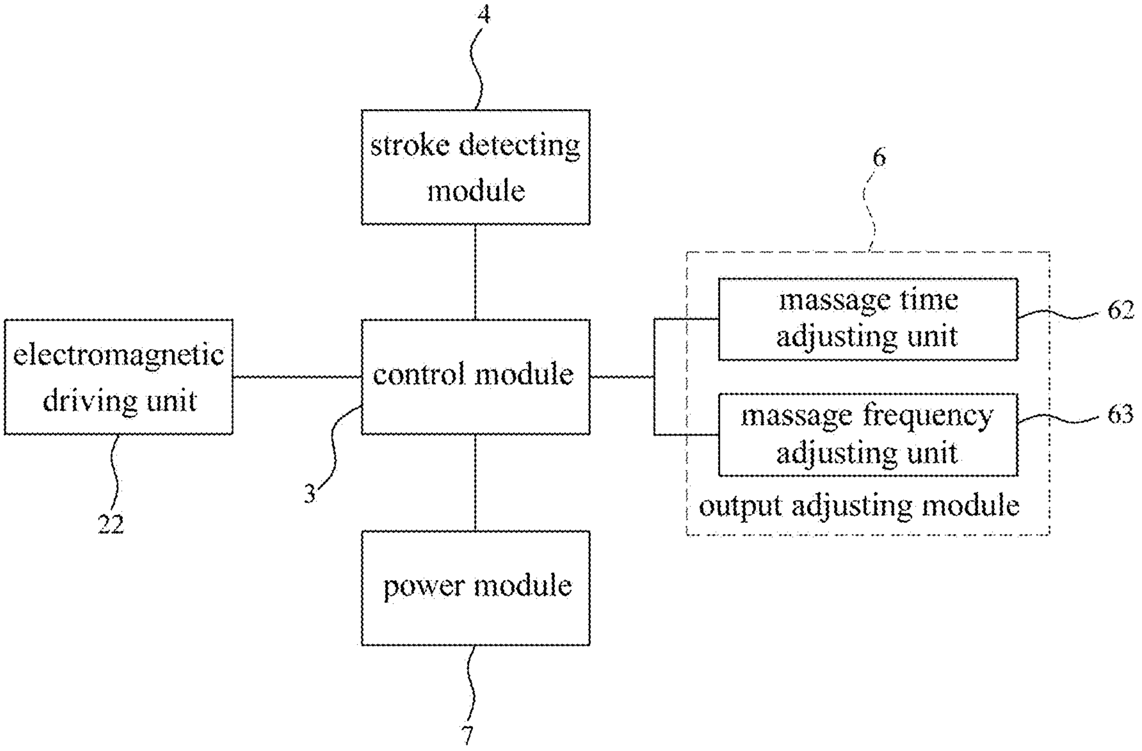
FIG. 3 is a view schematically showing the first embodiment of the present invention.

Reference is made to FIG. 1, FIG. 2, and FIG. 3. FIG. 1 is an exploded view of a first embodiment of the present invention, FIG. 2 is a cross-sectional view of the first embodiment of the present invention, and FIG. 3 is a view schematically showing the first embodiment of the present invention. As shown in the figures, the electric massage device of this embodiment mainly comprises a massage module 2, a control module 3, a stroke detecting module 4, an output adjusting module 6, a power module 7, and a message head 8. In this embodiment, the power module 7 is connected to the mains through a plug, but not limited to the above disclosure. In other embodiments, the power module 7 may be in other power supply modes, for example, the power module 7 may comprise a battery and its related control circuit.

The massage module 2 includes an output shaft 21, two ring magnets 210, three magnetically permeable members 211, and an electromagnetic driving unit 22. The ring magnets 210 are disposed on the output shaft 21, and the two ring magnets 210 are arranged so that the respective ends of the two ring magnets 210 adjacent to each other have the same polarity. The three magnetically permeable members 211 are arranged so that one magnetically permeable member 211 is interposed between the two ring magnets 210, and the other two magnetically permeable members 211 are located on the front and rear sides of the two ring magnets 210, respectively. By means of such a configuration, the ring magnets 210 can generate a radial magnetic field along at least a partial area of the output shaft 21. The electromagnetic driving unit 22 is arranged radially outside the ring magnets 210.

In this embodiment, the electromagnetic driving unit 22 includes a yoke ring bracket 221, a coil 222, and an annular coil holder 223. The output shaft 21 extends through the yoke ring bracket 221 and the annular coil holder 223, and the coil 222 is wound around the annular coil holder 223. As shown in the figure, the yoke ring bracket 221 is configured to hold and house the annular coil holder 223, and guide the magnetic field of the ring magnet 210 to interact with the current flowing through the coil 222 so as to generate an electromagnetic force. On the other hand, it is particularly noted that the yoke ring bracket 221 interacts with the ring magnets 210 of the output shaft 21 to generate a cogging torque. The massage device of this embodiment further utilizes the cogging torque to make it have beneficial effects on the entire massage cycle, as detailed later.

The control module 3 of this embodiment may include a processor, a circuit board and other electronic devices. The control module 3 is mainly used to control various functions of the massage device. As shown in FIG. 1 and FIG. 3, the present embodiment further includes a stroke detecting module 4, which is arranged on a motor housing or a casing, and is electrically connected to the control module 3, and used to determine whether the output shaft 21 is located at an initial position. The massage head 8 is disposed on an outer end of the output shaft 21 and provided to hit the user's skin. The massage head 8 is a detachable part. In this embodiment, different types of massage heads 8 can be used according to different needs. For example, in the case that the deep muscles or acupuncture points are to be massaged, a massage head 8 with an acute tip can be used, and in the case that a large area of superficial muscle is to be massaged, a disc-shaped or spherical massage head 8 can be used.

The operation of this embodiment will be described below. A single massage cycle includes an outward stroke and a return stroke. In the outward stroke, when the output shaft 21 is at the initial position of the outward stroke, the control module 3 applies a driving current $I_D$ to the electromagnetic driving unit 22. At this time, the coil 222 of the electromagnetic driving unit 22 is applied with the driving current to form an electromagnetic field, which interacts with the radial magnetic field generated by the ring magnet 210 to drive and push the output shaft 21 toward the user.

Specifically, in the outward stroke of this embodiment, the driving current $I_D$ applied by the control module 3 to the electromagnetic driving unit 22 is gradually increased in a linear relationship or a non-linear relationship with the elapsed time of the outward stroke of the output shaft 21. In other words, the driving current $I_D$ is gradually increased in response to the elapsed time of the outward stroke of the output shaft 21 moving from the initial position to the end position; that is, the massage force exerted by the massage head 8 is also gradually increased as the output shaft 21 moves from the initial position to the end position. In the present invention, the driving current $I_D$ may not necessarily be increased in response to the elapsed time of the outward stroke of the output shaft 21, but the driving current $I_D$ may be increased according to the real-time stroke displacement value of the output shaft 21. For example, the real-time stroke displacement value of the output shaft 21 is detected by the stroke detecting module 4, and the driving current $I_D$ is increased with the change of the displacement value.

In this way, in the early stage of the outward stroke, the massage force is weak due to the smaller driving current $I_D$ and hence would not cause skin hurt when the massage head 8 impacts the skin. Then, as the output shaft 21 moves toward the end point of the output stroke, the driving current $I_D$ is gradually increased, and the massage force is also gradually increased. Therefore, a substantial massage effect can be produced on the deep muscles.

In the return stroke of this embodiment, during which the output shaft 21 moves away from the user after impacting the intended point on the human body of the user where the massage is applied, no driving current $I_D$ is applied to the massage module 2 so that the massage module 2 is deenergized, and the output shaft 21 is pressed back by the user's force; that is, the user holds the massage device and presses the massage device against his body. It is noted that during the return stroke of this embodiment, the cogging torque generated between the yoke ring bracket 221 and the ring magnets 210 also forms an auxiliary pulling force to assist in pulling the output shaft 21 back to an intermediate position.

The initial position of the outward stroke of this embodiment is fixed. In other words, the control module 3 applies the driving current $I_D$ to the electromagnetic driving unit 22 again only when the user has returned the output shaft 21 to the initial position. In this embodiment, the stroke detecting module 4 is configured to determine whether the output shaft 21 has reached the initial position. On the other hand, the time period of the output stroke in this embodiment can be set by the user; that is, the user can set the time period of the output stroke through the output adjusting module 6. The longer the time period of the outward stroke is, the stronger the massage force is, and the deep muscles can be more effectively massaged.

In particular, in another modified embodiment of the present invention, a weak reverse current having a polarity opposite to the driving current and smaller than the driving current can also be applied to the electromagnetic driving unit 22 in order to assist in returning of the output shaft 21, and the reverse current is less than one-fifth of the driving current. This embodiment is particularly suitable for the case that the portion to be massaged such as muscles, bones, and ligaments have inflammation, laceration, etc. or for the case that the portion to be massaged is injured. If the portion to be massaged is hurt or injured, it is usually difficult for the user to tolerate the pain caused by pressing the output shaft 21 back to the initial position. In such a case, the output shaft 21 can automatically return to the initial position with the aid of the reverse current and the cogging torque and gets ready for the next outward stroke. The reverse current is generated according to the set time period of the outward stroke, and can be fine-tuned based on the time period during which the output shaft 21 properly returns to the initial position.

Figure 4:
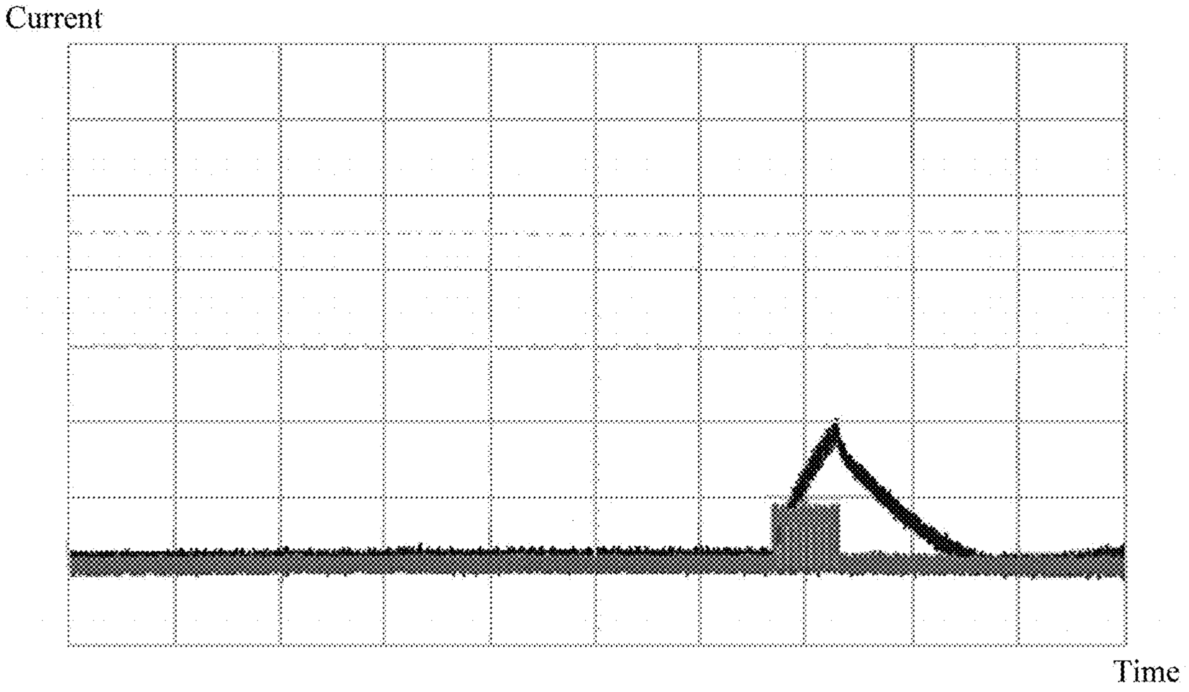
FIG. 4 is a measured waveform diagram of a driving current of the first embodiment of the present invention.

Reference is made to FIGS. 3 and 4. FIG. 4 is a measured waveform diagram of the driving current according to the first embodiment of the present invention. As shown in FIG. 4, the lower square wave is a pulse width modulation (PWM) switch signal. The front edge of the square wave shows the initial position of the outward stroke, and the back edge of the square wave shows the end position of the outward stroke. The upper line waveform presents an applied current waveform, and the upper line waveform corresponding to the square wave is the driving current $I_D$. As shown in FIG. 3, the output adjusting module 6 of this embodiment includes a massage time adjusting unit 62 and a massage frequency adjusting unit 63, each of which can be implemented by a respective knob device composed of a variable resistor. Of course, the massage time adjusting unit 62 and the massage frequency adjusting unit 63 can also be implemented by touch screens, physical buttons, or other equivalent user interfaces and electronic devices.

The massage time adjusting unit 62 is configured to adjust the time period during which the driving current $I_D$ is applied to the massage generating module 2, that is, to adjust the travel distance of the massage head 8, i.e. the outward stroke. The longer the outward stroke is, the more deeply the muscles can be massaged. As shown in FIG. 4, the longer the time of the rising line is, the greater the strength is. The massage frequency adjusting unit 63 is configured to adjust the frequency of the driving current $I_D$ applied to the massage generating module 2, that is, to adjust the cycle time of the massage cycle. The higher the frequency is, the faster the output shaft 21 reciprocates.

The relationship between the time period during which the driving current $I_D$ is applied and the operation frequency of the massage cycle of this embodiment will be described below. First, it is explained that the basic equivalent circuit of this embodiment can be simplified as an RL circuit, and the time constant (τ) during the charging period of the RL circuit can be obtained using the equation $\tau=L/R$, wherein L is the inductance value and R is the resistance value. In this embodiment, L is 5 H and R is 3Ω, so the value of τ is 1.66 ms. Therefore, according to this embodiment, the applied current can be increased continuously within the time period which is 5 times the value of τ. Once the time period during which the driving current is applied exceeds 5 times the value of τ, the current tends to be saturated and cannot be increased. In this embodiment, 5 times the value of τ is 8.3 ms.

Figure 5A:
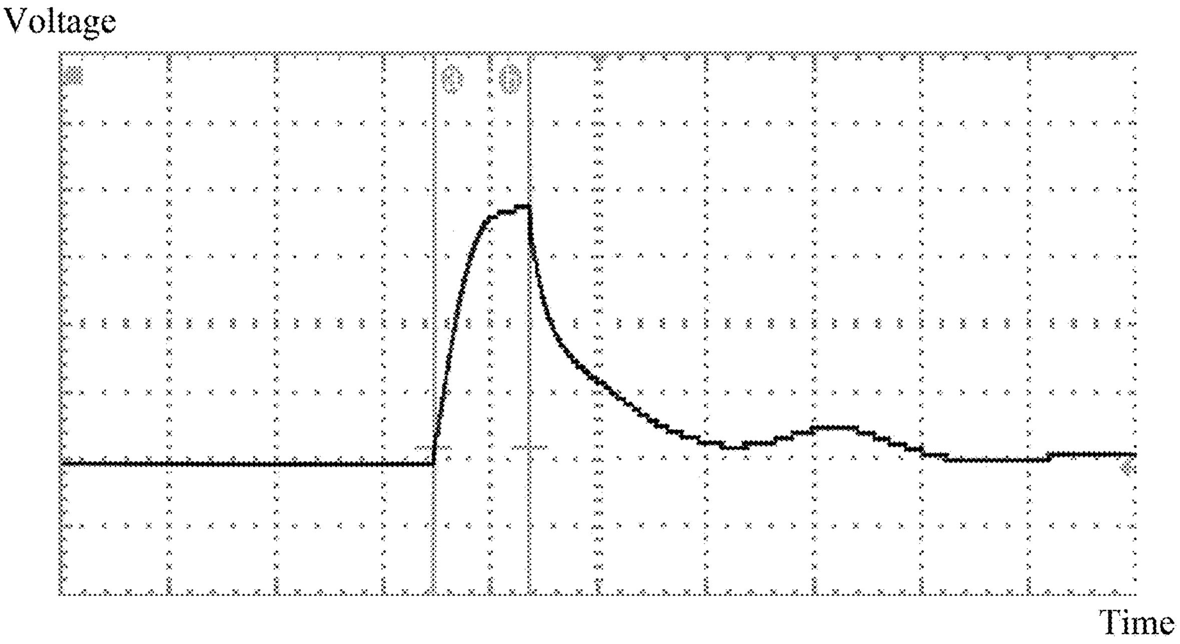
FIGS. 5A, 5B, and 5C are voltage waveform diagrams of the first embodiment of the present invention with operation frequencies of 2.5 Hz, 15 Hz, and 75 Hz, respectively.
Figure 5B:
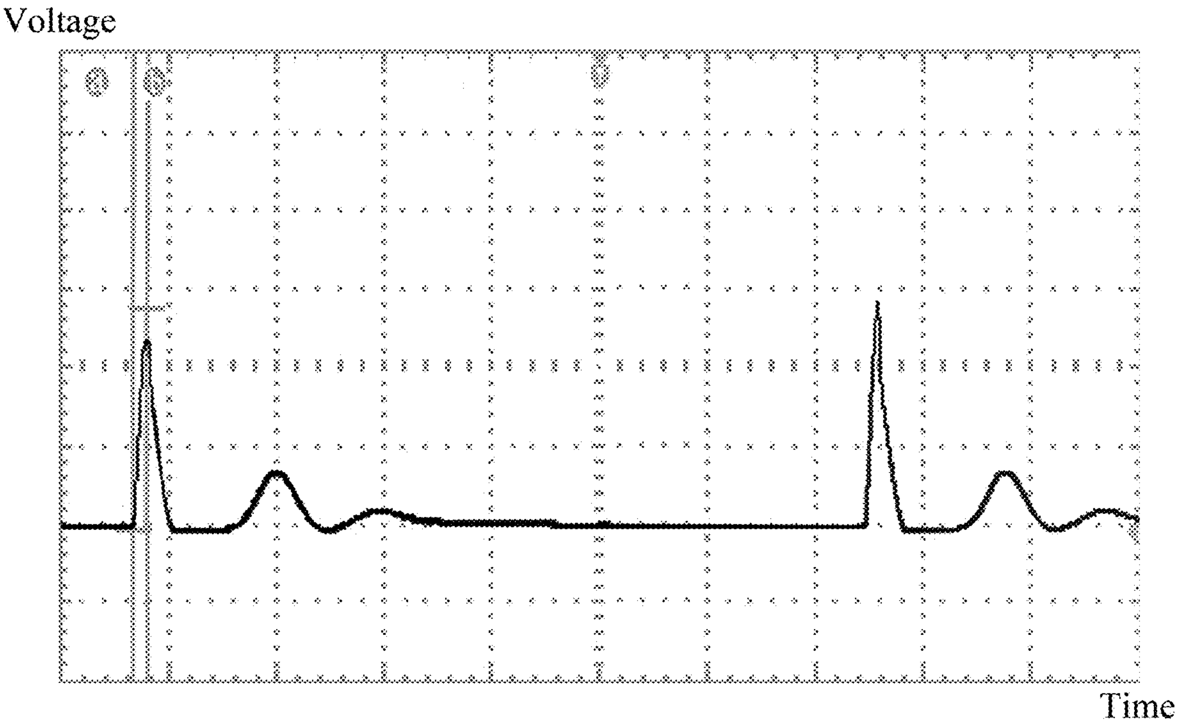
Figure 5C:
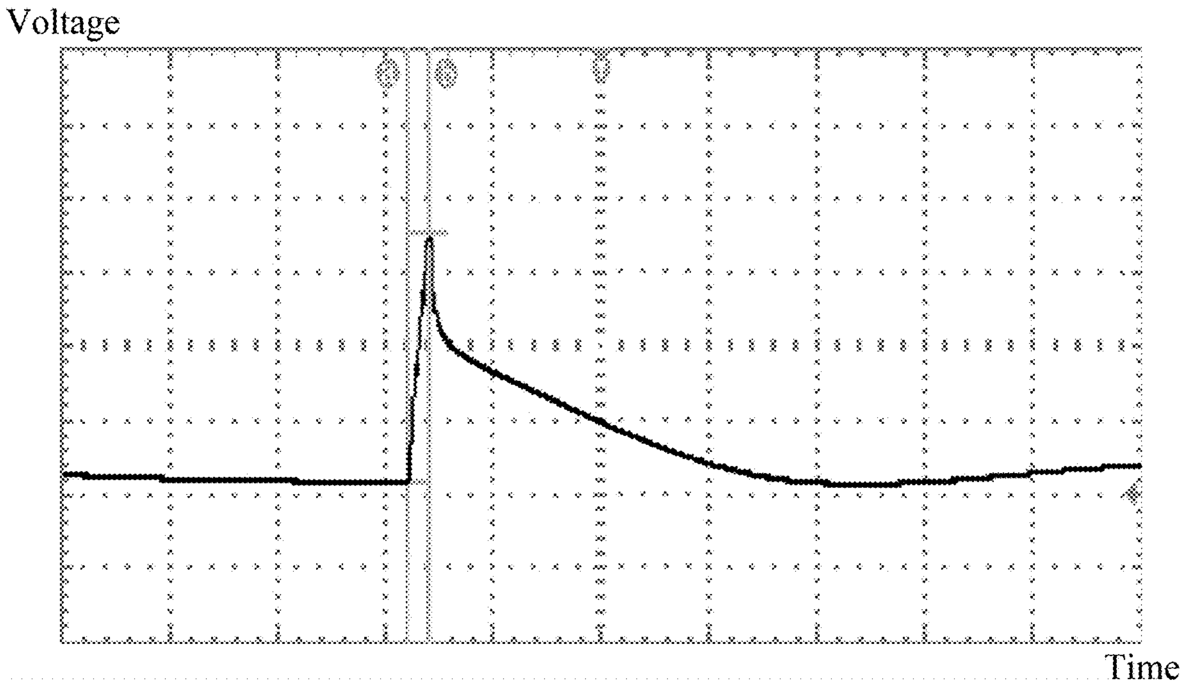

Reference is made to Table 1 and FIGS. 5A, 5B, and 5C. Table 1 shows the cycle time (T), the time period during which the current is applied (t), the time constant (τ), and the ratio of the cycle time to the time period during which the current is applied (T/t) at different operation frequencies. FIGS. 5A, 5B, and 5C are voltage waveform diagrams of the first embodiment of the present invention with the operation frequencies of 2.5 Hz, 15 Hz, and 75 Hz, respectively.

TABLE 1

| Frequency (Hz) | Cycle time (T, ms) | Time period during which the current is applied (t, ms) | Time constant (τ) | Ratio of T to t (T/t) |
|---|---|---|---|---|
| 75 | 13.33 | 0.2 | 0.120482 | 66.65 |
| 15 | 66.7 | 1.3 | 0.783133 | 51.30769 |
| 2.5 | 400 | 3.6 | 2.168675 | 111.1111 |

As shown in FIG. 5A, when the operation frequency is 2.5 Hz, the time period during which the driving voltage rises from point a (the start of output) to point b (the end of output) is about 3.6 ms, which is about 2.1687τ, and the cycle time is 400 ms. The ratio (T/t) is 111.11.

As shown in FIG. 5B, when the operation frequency is 15 Hz, the time period during which the driving voltage rises from point a to point b is about 1.3 ms, which is about 0.7831τ, and the cycle time is 66.7 ms. The ratio (T/t) is 51.31.

As shown in FIG. 5C, when the operation frequency is 75 Hz, the time period during which the driving voltage rises from point a to point b is about 0.2 ms, which is about 0.1204τ, and the cycle time is 13.33 ms. The ratio (T/t) is 66.65.

It can be seen from the above that the higher the operation frequency is, the shorter the cycle time of each reciprocation of the output shaft is, and the shorter the time period during which the current is applied is. As compared with the existing massage device, regardless of the operation frequency, the electric massage device of the present invention has a short time period during which the current is applied, which is less than one-tenth of the cycle time; that is, the time period during which the driving current is applied is quite short. According to the result of Fourier transform, the resulting bandwidth is quite wide. Therefore, it is easy for the electric massage device to operate at the resonant frequency of the muscle; that is, the output massage can easily cause a resonance with the muscle so that a pain caused by the soft tissue disorder can be relieved, the blood circulation can be promoted, and the massage effect can be improved.

Figure 6:
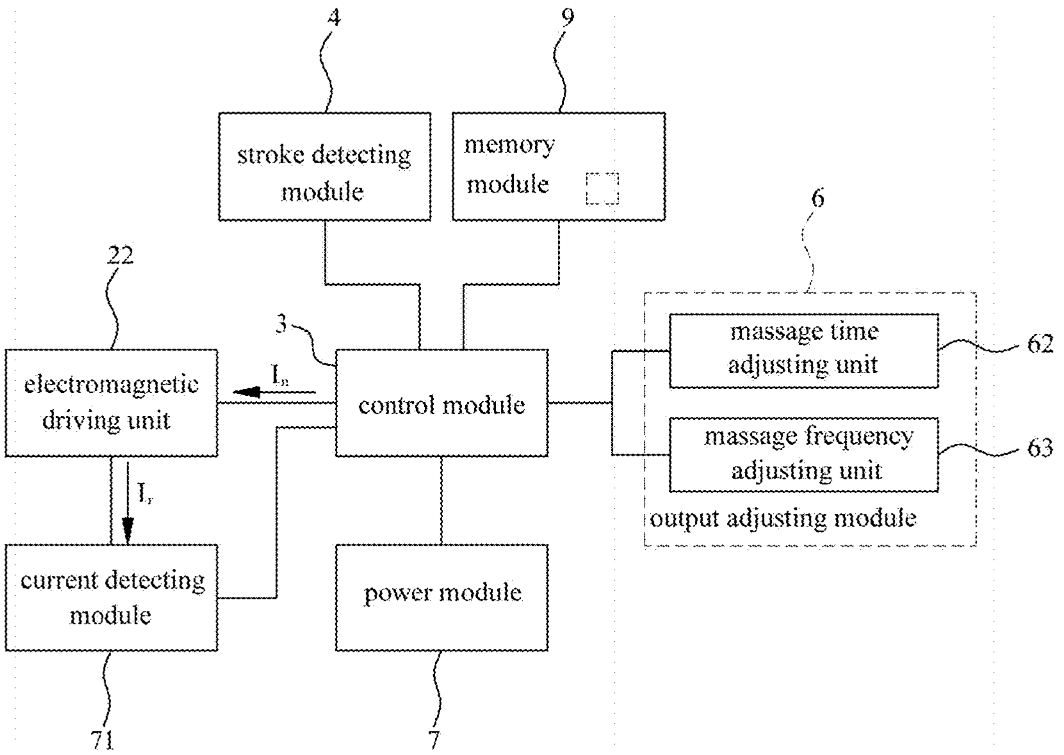
FIG. 6 is a view schematically showing a second embodiment of the present invention.

Reference is made to FIG. 6 which is a view schematically showing a second embodiment of the present invention. The main difference between the second embodiment of the present invention and the aforementioned first embodiment lies in that the driving current $I_D$ applied in this embodiment is not gradually increased with the elapsed time of the outward stroke, but is adjusted according to a predetermined position parameter table. Specifically, the electric massage device of this embodiment further includes a memory module 9, which stores a current-position function table 91 in which each stroke displacement value and its corresponding driving current value are recorded. The stroke displacement value is the displacement of the output shaft 21, and in other embodiments, it may be also the absolute position value of the output shaft 21.

After the control module 3 receives the real-time stroke displacement value detected by the stroke detecting module 4, the corresponding driving current value is looked up from the current-position function table 91, and then the driving current $I_D$ applied to the electromagnetic driving unit 22 is adjusted to match with the corresponding driving current value. Accordingly, the adjustment of the massage force will become more flexible; that is, during the outward stroke, by setting various parameters in the current-position function table 91, various controls can be made to the massage force to achieve more diversified, more comfortable and more effective massage quality.

On the other hand, this embodiment can further implement artificial intelligence (AI) control. The control module 3 can also update the aforementioned current-position function table 91 autonomously according to the elasticity coefficient of the user's muscle tissue. Specifically, the control module 3 of this embodiment can output a specific driving current $I_D$ corresponds to a massage force F at the beginning. It can also record the real-time stroke displacement value fed back by the stroke detecting module 4 so as to calculate the speed value of the output shaft and hence obtain the acceleration value.

Specifically, when the control module 3 outputs a specific driving current $I_D$ at a specific position, the corresponding massage force F can be looked up from the current-position function table 91. According to Newton's law of motion $F-(k\times\Delta x)=m\times a$, the control module 3 can calculate the elasticity coefficient of the muscle tissue where the massage is applied per unit time. In other words, the elasticity coefficients of the muscle tissue at different depths can be obtained. Thereby, from the obtained elasticity coefficient information at each depth where the massage is to be applied, the muscle states can be definitely known, and the massage force can be fine-tuned according to the muscle states.

In the aforementioned formula, "m" is the overall mass of the output shaft 21 (that is, the mass of the entire output shaft assembly including the massage head 8, the ring magnets 210, the magnetically permeable members 211, and all other parts arranged on the output shaft 21), "a" is the acceleration value of the output shaft 21, "k" is the elasticity coefficient of the muscle tissue, "$\Delta x$" is the real-time stroke displacement value per unit time fed back by the stroke detecting module 4. The other formulas are shown as "$v=\Delta x_0/\Delta t$", "$\Delta x=v\Delta t+1/2\times a\times(\Delta t)^2$", "$\Delta x-\Delta x_0=1/2\times a\times(\Delta t)^2$", wherein "$\Delta x_0$" is the real-time stroke displacement value within the previous unit time, "v" is the speed value, "$\Delta t$" is the unit time. The acceleration value a of the output shaft 21 can be obtained by dividing the aforementioned $2(\Delta x-\Delta x_0)$ by the square of the unit time. The memory module 9 can also pre-store the elasticity coefficient range values of a plurality of muscle tissues and the adjustment coefficients of the current-position function table corresponding to each elasticity coefficient range value. Accordingly, the control module 3 of this embodiment can calculate the elasticity coefficient of the muscle tissue where the massage is applied, and thereby can autonomously modify (update) the driving current value in the current-position function table.

Specifically, for example, when a portion to be massaged is a harder muscle tissue, even if the driving current $I_D$ is increased, the real-time stroke displacement value fed back by the stroke detecting module 4 may be small. At this time, the control module 3 can autonomously modify the driving current value in the current-position function table 91 with a specific ratio to increase the massage force. On the contrary, when a portion to be massaged is a softer muscle tissue, under a constant driving current $I_D$, the real-time stroke displacement value fed back by the stroke detecting module 4 would change greatly. At this time, the control module 3 can autonomously modify the driving current value in the current-position function table 91 with a specific ratio to reduce the massage force so as to achieve more comfortable and more effective massage.

This embodiment further comprises a current detecting module 71, which is electrically connected to the control module 3 and the electromagnetic driving unit 22, and is configured to detect a feedback current $I_f$ from the electromagnetic driving unit 22. That is to say, the driving current $I_D$ is adjusted in a closed-loop control fashion according to the feedback current $I_f$ detected by the current detecting module 71. Specifically, the control module 3 of this embodiment compares the feedback current $I_f$ detected by the current detecting module 71 with a set current (a predetermined driving current $I_D$) to adjust the driving current $I_D$ of the massage module 2 in a closed-loop control fashion and to instantly fine-tune the driving current $I_D$ applied to the massage module 2 so that the actual driving current $I_D$ matches the set current (the predetermined driving current $I_D$) to ensure the desired massage force of the massage module.

The preferred embodiments of the present invention are illustrative only, and the claimed inventions are not limited to the details disclosed in the drawings and the specification. Accordingly, it is intended that it have the full scope permitted by the language of the following claims.

What is claimed is:

1. An electric massage device capable of gradually increasing a massage force during an outward stroke, comprising:

a massage module, including an output shaft and an electromagnetic driving unit configured to drive and move the output shaft linearly so as to exert the massage force on a user; and a control module for energizing the electromagnetic driving unit, the control module being electrically connected to the electromagnetic driving unit, wherein one massage cycle includes the outward stroke and a return stroke; in the outward stroke, the control module applies a driving current to the electromagnetic driving unit, and the control module gradually increases intensity of the driving current applied to the electromagnetic driving unit until the end of the output stroke in response to an elapsed time of the outward stroke or a stroke displacement of the output shaft; in the return stroke, the control module consistently deenergizes the electromagnetic driving unit or applies a reverse current to the electromagnetic driving unit, the reverse current is of an opposite polarity to the driving current, and intensity of the reverse current is less than one-fifth of the intensity of the driving current.

2. The electric massage device according to claim 1, wherein the stroke displacement of the output shaft is detected by a stroke detecting module which is electrically connected to the control module.

3. The electric massage device according to claim 2, further comprising a memory module which is electrically connected to the control module and in which a current-position function table is stored, wherein the stroke detecting module detects a real-time stroke displacement value of the output shaft, the current-position function table includes a plurality of real-time stroke displacement values and a plurality of driving current values corresponding to the real-time stroke displacement values, respectively, and wherein the driving current is adjusted by the control module according to a driving current value obtained from the current-position function table corresponding to the real-time stroke displacement value detected by the stroke detecting module.

4. The electric massage device according to claim 2, wherein the control module applies the driving current to the electromagnetic driving unit, the stroke detecting module detects the real-time stroke displacement, and the control module then calculates a muscle elasticity coefficient and adjusts the driving current value, accordingly.

5. The electric massage device according to claim 1, further comprising an output adjusting module, electrically connected to the control module and configured to adjust at least one of a current frequency of the driving current applied to the massage module and a time period during which the driving current is applied to the massage module.

6. The electric massage device according to claim 5, wherein the output adjusting module includes a massage time adjusting unit, which is configured to adjust the time period during which the driving current is applied to the massage module.

7. The electric massage device according to claim 5, wherein the output adjusting module includes a current frequency adjusting unit, which is configured to adjust the current frequency of the driving current applied to the massage module.

8. The electric massage device according to claim 1, further comprising a current detecting module, electrically connected to the control module and the electromagnetic driving unit and configured to detect a feedback current of the electromagnetic driving unit, wherein the driving current is adjusted by the control module in a closed-loop control fashion in response to the feedback current.

9. The electric massage device according to claim 1, wherein in the outward stroke, a time period during which the driving current is applied to the electromagnetic driving unit by the control module is less than one-tenth of a cycle time of the massage cycle.

10. The electric massage device according to claim 1, wherein in the outward stroke, a time period during which the driving current is applied to the electromagnetic driving unit by the control module is less than five times a time constant, and the time constant is a ratio of a total inductance value of the electromagnetic driving unit to a total resistance value of the electromagnetic driving unit.

* * * * *